United States Patent
Yu

(10) Patent No.: US 7,562,890 B2
(45) Date of Patent: Jul. 21, 2009

(54) FRONT FRAME FOR A BICYCLE

(75) Inventor: Kuo-Pin Yu, Taichung (TW)

(73) Assignee: Yuan Min An Enterprise Co., Ltd., Taichung (TW)

( * ) Notice: Subject to any disclaimer, the term of this patent is extended or adjusted under 35 U.S.C. 154(b) by 105 days.

(21) Appl. No.: 11/542,196

(22) Filed: Oct. 4, 2006

(65) Prior Publication Data

US 2008/0018075 A1 Jan. 24, 2008

(30) Foreign Application Priority Data

Jul. 24, 2006 (TW) ................................ 95213022 U

(51) Int. Cl.
*B62K 19/16* (2006.01)
(52) U.S. Cl. ............................... 280/288.3; 280/288.1
(58) Field of Classification Search ............... 280/281.1, 280/288.2, 288.3, 274, 279, 288.1
See application file for complete search history.

(56) References Cited

U.S. PATENT DOCUMENTS

| 535,188 | A | * | 3/1895 | Barnes | 403/174 |
| 544,021 | A | * | 8/1895 | Bellis | 280/281.1 |
| 599,993 | A | * | 3/1898 | Busse | 280/281.1 |
| 692,811 | A | * | 2/1902 | Anderson | 280/281.1 |
| 3,966,230 | A | * | 6/1976 | Nicol | 280/281.1 |
| 4,479,662 | A | * | 10/1984 | Defour et al. | 280/281.1 |
| 4,900,049 | A | * | 2/1990 | Tseng | 280/281.1 |
| 6,270,104 | B1 | * | 8/2001 | Nelson et al. | 280/281.1 |
| 7,137,639 | B2 | * | 11/2006 | Meggiolan | 280/281.1 |

FOREIGN PATENT DOCUMENTS

| DE | 93 16 432 U1 | 1/1994 |
| EP | 0 685 386 A | 12/1995 |
| WO | 98/54046 A2 | 12/1998 |

OTHER PUBLICATIONS

European Search Report dated Sep. 9, 2008.

* cited by examiner

*Primary Examiner*—Anne Marie M. Boehler
(74) *Attorney, Agent, or Firm*—Browdy and Neimark, P.L.L.C.

(57) ABSTRACT

A front frame for a bicycle includes an upper tube, a lower tube and a head tube all of which are made of fiber reinforced material. The head tube extends integrally from a front end of the upper tube and a front end of the lower tube. The head tube has a chamber communicates with a chamber of the upper tube and a chamber of the lower tube. Two inner tubes are provided in the chamber of the upper tube. The abutted portions of the two inner tubes form a rib such that the structure strength of the upper tube is improved.

6 Claims, 3 Drawing Sheets

FRONT FRAME FOR A BICYCLE

BACKGROUND OF THE INVENTION

1. Field of the Invention

The present invention relates to a bicycle and more particularly to such a front frame for a bicycle, which has strong structure and light weight.

2. Description of the Related Art

A conventional frame for a bicycle is made of metal and has strong structure and heavy weight. Recently, the bicycle is developed towards reducing its weight and adopts fiber reinforced material. As shown in FIG. 1, the frame 1 is made of carbon fiber reinforced resin and assembled by a front frame 2, a center shaft 3 and a rear frame 4. The front frame 2 has an upper tube 5, a head tube 6 and a lower tube 7. As shown in FIG. 2, the front frame 2 is manufactured by the steps of winding multiple layers of pre-pregs into an elongated tube 8, forming two openings 81 at two predetermined positions of the elongated tube 8, inserting a cured tube 9 into the elongated tube 8 through one of the openings 81 such that the two distal ends of the cured tube 9 are flush with the two openings 81 of the elongated tube 8, and placing the elongated tube 8 and the cured tube 9 into a die, and then curing the elongated tube 8.

The front frame 2 manufactured by aforesaid method has low structure strength since it is easy to crack at the junction of the cured tube 9 and the head tube 6. The upper tube 5 and the lower tube 7, which has not enough structure strength, are easy to break upon bearing large stress. If the quantity of the pre-pregs used in the front frame 2 is increase for enhancing the structure strength, the weight of the product is unintentionally increased. Therefore, there is always a problem as how to reduce the weight of the front frame 2 and increase the structure strength at the same time.

SUMMARY OF THE INVENTION

An objective of the present invention is to provide a front frame for a bicycle, which has high structure strength and light weight.

The foregoing objective of the present invention are attained by the front frame includes an upper tube, a lower tube and a head tube all of which are made of fiber reinforced material. The upper tube has a chamber therein and the lower tube has a chamber therein, too. The head tube extends integrally from a front end of the upper tube and a front end of the lower tube. The upper tube, the head tube and the lower tube are disposed substantially at a same plane. The head tube has a chamber and two openings. The chamber of the head tube communicates with the chamber of the upper tube and the chamber of the lower tube. Two inner tubes may be provided in the chamber of the upper tube. The abutted portions of the two inner tubes form a rib such that the structure strength of the upper tube is improved.

DETAILED DESCRIPTION OF THE INVENTION

Figure 3:
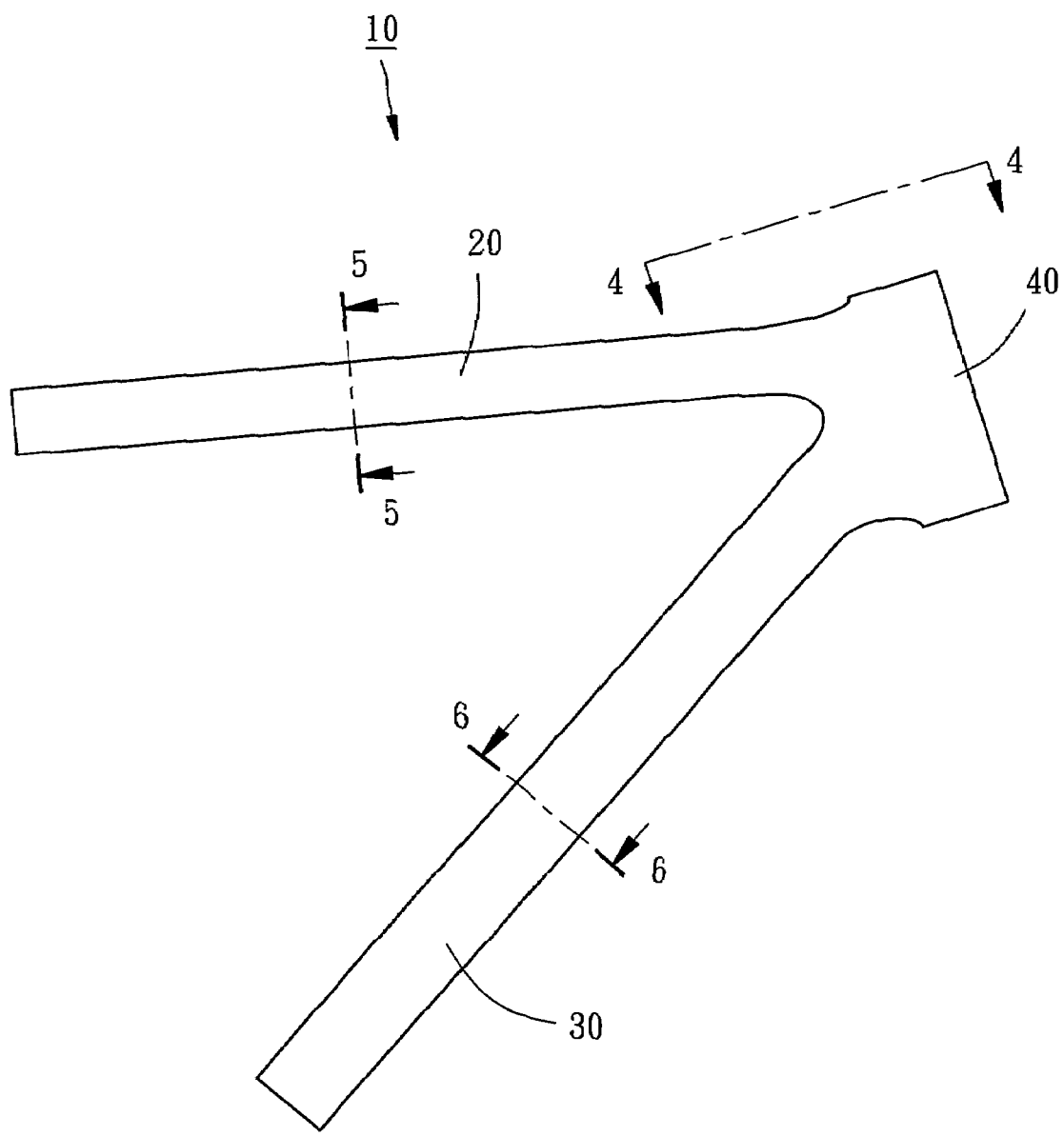
FIG. 3 is a front view of a preferred embodiment of the present invention.

Referring to FIG. 3, a front frame 10 for a bicycle in accordance with the preferred embodiment of the present invention is shown comprising an upper tube 20, two first inner tubes 24, a lower tube 30, two second inner tubes 34 and a head tube 40 all of which are made of fiber reinforced resin material. The fiber can adopt but not restrict to carbon fiber, glass fiber, boron fiber or Kevlar® fiber. The resin can adopt thermosetting resin or thermoplastic resin.

Figure 4:
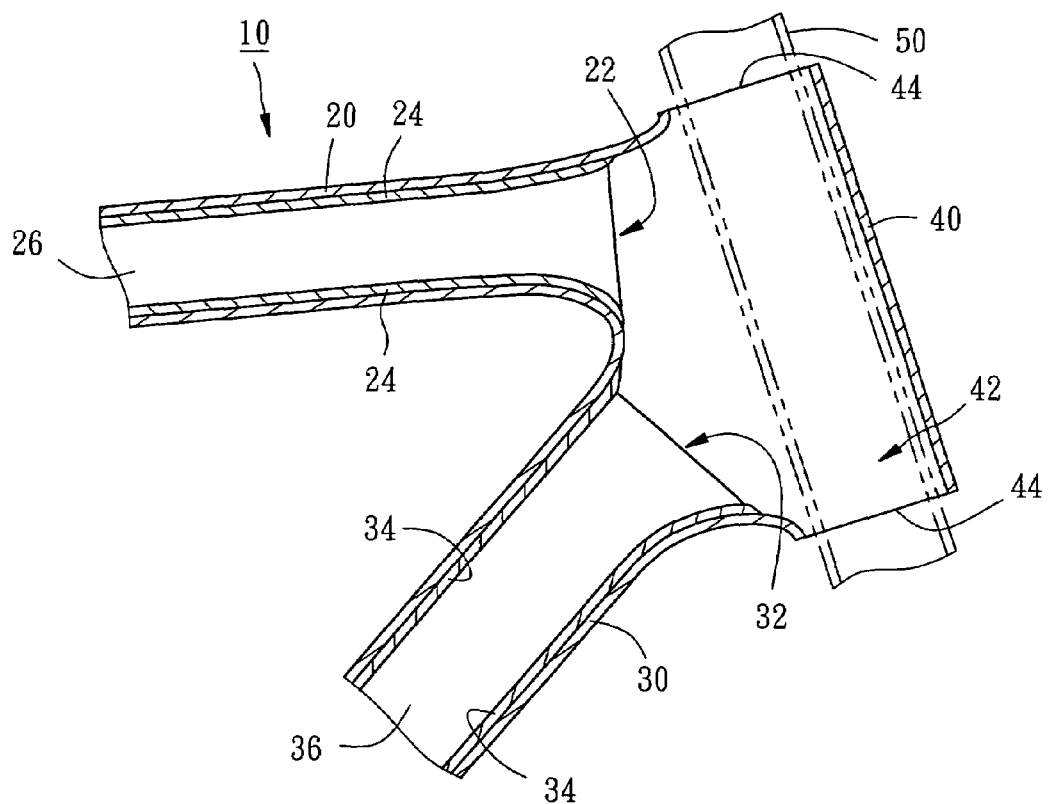
FIG. 4 is a sectional view along the 4-4 line in FIG. 3.
Figure 5:
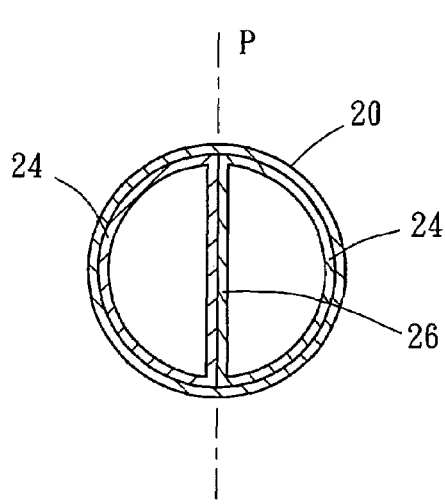
FIG. 5 is a sectional view along the 5-5 line in FIG. 3.
Figure 6:
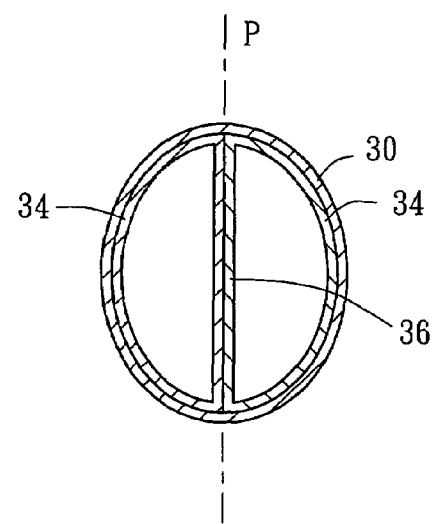
FIG. 6 is a sectional view along the 6-6 line in FIG. 3.

As shown in FIGS. 4-6, the upper tube 20, the lower tube 30 and the head tube 40 are formed integrally. The upper tube 20 has a chamber 22 therein. The two first inner tubes 24 abut together and are disposed in the chamber 22 of the upper tube 20. The upper tube 20 and the two first inner tubes 24 are closely contacted without a gap therebetween. The abutted portions of the first inner tubes 24 form an upper rib 26. The lower tube 30 has a chamber 32 therein, too. The two second inner tubes 34 abut together and are disposed in the chamber 32 of the lower tube 30. The lower tube 30 and the two second inner tubes 34 are closely contacted without a gap therebetween. The abutted portions of the second inner tubes 34 form a lower rib 36.

The head tube 40 extends integrally from a front end of the upper tube 20 and a front end of the lower tube 30. The upper tube 20, the head tube 40 and the lower tube 30 are disposed at a same plane P. The upper rib 26 of the upper tube 20 is parallel to the plane P. The lower rib 36 of the lower tube 30 is parallel to the plane P, too. The head tube 40 has a chamber 42 for receiving an upright tube 50 of a front fork (not shown), and two openings 44 communicating the chamber 42 with outside. The chamber 42 of the head tube 40 communicates with the chamber 22 of the upper tube 20 and the chamber 32 of the lower tube 30. The first inner tubes 24 each have an inside communicates with the chamber 42 of the head tube 40, and the second inner tubes 34 each have an inside communicates with the chamber 42 of the head tube 40, too.

The front frame 10 is manufactured by the following steps. First, abut the two first inner tubes 24 together and abut the two second inner tubes 34 together. Then wind multiple layers of pre-pregs around the two first inner tubes 24 to form a precured upper tube 20, and wind multiple layers of pre-pregs into a precured head tube 40 at the front end of the upper tube 20, and wind multiple layers of pre-pregs around the two second inner tubes 34 to form a precured lower tube 30. Finally, place the combination into a die (not shown) and inflate the two first inner tubes 24, the two second inner tubes 34 and the head tube 40 with high pressure air to make the two first inner tubes 24 (or two second inner tubes 34) join with the precured upper tube 20 and the precured lower tube 30 tight on the one hand, and to make the precured upper tube 20, lower tube 30 and head tube 40 abut on the inner wall of the die on the other hand. Then cure the combination to form the final front frame 10 formed by the cured upper, lower and head tubes 20, 30 and 40.

Figure 1:
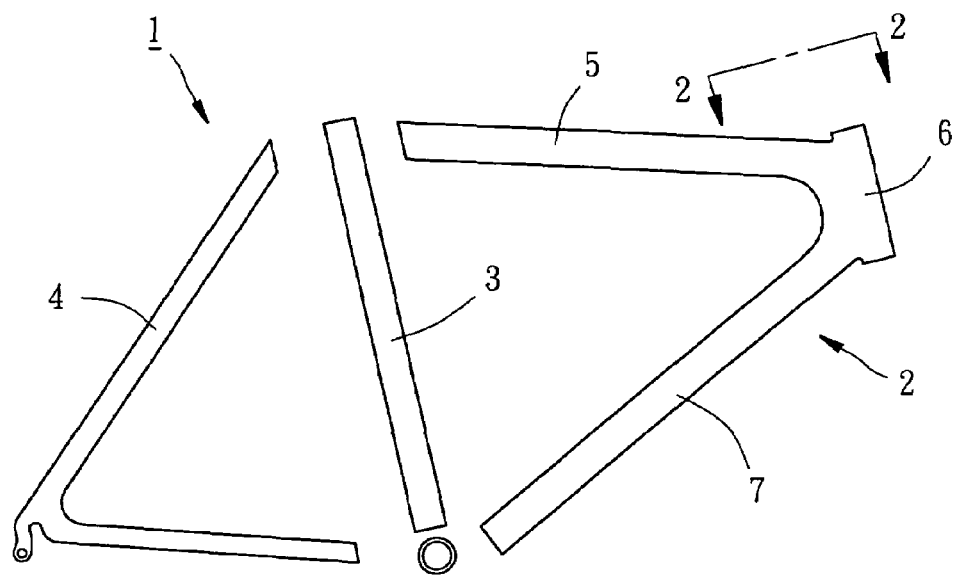
FIG. 1 is an explosive view of the frame of a conventional bicycle.
Figure 2:
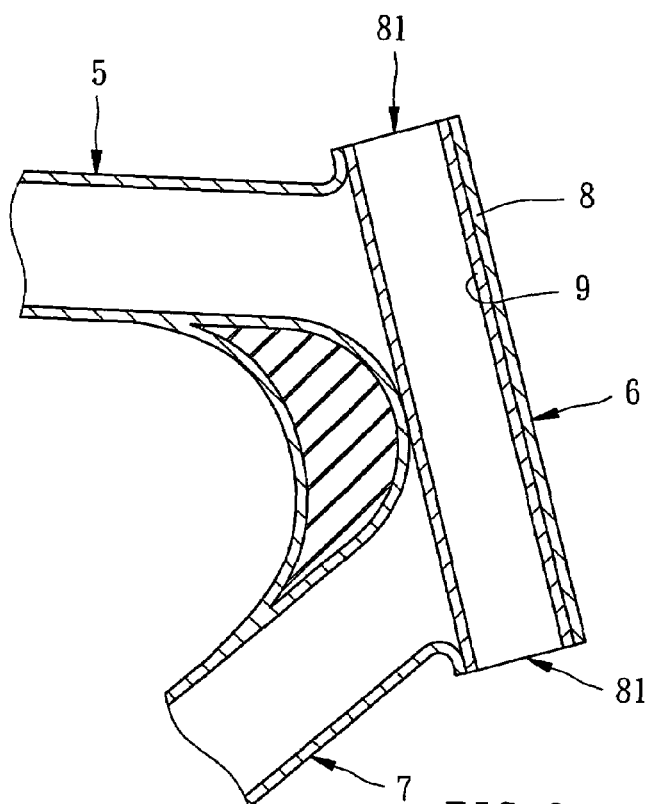
FIG. 2 is a sectional view along the 2-2 line in FIG. 1.

Since the front frame 10 is cured only once, there is no crack generated between the first inner tube 24 (or two second inner tubes 34) and the upper tube 20 (or the lower tube 30). The structure strength of the front frame 10 is improved. Besides, since the upper tube 20 has the upper rib 26 inside and the lower tube 30 has the lower rib 36 inside, the structure strength of the upper tube 20 and the lower tube 30 are improved. Under the premise that the structure strength of the front frame 10 is enough, the quantity of the pre-pregs used in the front frame 10 can be reduced such that the weight of the front frame 10 can be decreased. The weight of the front frame 10 of the present invention is further decreased since the front frame 10 does not have the eliminated cured tube 9 of the conventional structure shown in prior art FIG. 2. Therefore, the front frame 10 of the present invention can improve the drawback of the conventional structure and achieve the objective of the present invention.

In practice, the structure of the front frame 10 has other alternatives. For example, the extending direction of the upper rib 26 and the lower rib 36 can be changed according to user's demand. The upper rib 26 or the lower rib 36 may also not present. Although particular embodiments of the invention have been described in detail for purposes of illustration, various modifications and enhancements may be made without departing from the spirit and scope of the invention.

What is claimed is:

1. A front frame for a bicycle, comprising:
   two first inner tubes abutted together;
   two second inner tubes abutted together;
   an upper tube of cured multiple layers of fiber reinforced rein material wound around the two first inner tubes so that there is no crack between the upper tube and the two first inner tubes;
   a lower tube of cured multiple layers of fiber reinforced material wound around the second inner tubes so that there is no crack between the lower tube and the two second inner tubes; and
   a head tube of cured multiple layers of fiber reinforced material fixed together in a unit with an end of the upper tube and an end of the lower tube when the upper tube, lower tube and head tube are cured.

2. The front frame according to claim 1, wherein the upper tube, the lower tube and the head tube all lie in a same plane.

3. The front frame according to claim 2, wherein abutting sides of the first inner tubes form an upper rib along the longitudinal length of the upper tube.

4. The front frame according to claim 2, wherein abutting sides of the second inner tubes from a lower rib along the longitudinal length of the lower tube.

5. The front frame according to claim 3, wherein the upper rib is parallel to the same plane.

6. The front frame according to claim 4, wherein the lower rib is parallel to the same plane.

* * * * *